(12) United States Patent
Bertoldo

(10) Patent No.: US 10,591,005 B2
(45) Date of Patent: Mar. 17, 2020

(54) METHOD FOR THE PRODUCTION OF BRAKE PADS AND ASSOCIATED BRAKE PAD

(71) Applicant: ITT ITALIA S.r.l., Lainate (IT)

(72) Inventor: Pietro Bertoldo, Barge (IT)

(73) Assignee: ITT ITALIA S.r.l. (IT)

( * ) Notice: Subject to any disclaimer, the term of this patent is extended or adjusted under 35 U.S.C. 154(b) by 0 days.

(21) Appl. No.: 15/948,337

(22) Filed: Apr. 9, 2018

(65) Prior Publication Data
US 2018/0223925 A1 Aug. 9, 2018

Related U.S. Application Data

(63) Continuation of application No. 14/519,761, filed on Oct. 21, 2014, now Pat. No. 9,970,494.

(30) Foreign Application Priority Data

Oct. 21, 2013 (IT) .............................. TO2013A0855

(51) Int. Cl.
F16D 65/04 (2006.01)
F16D 65/092 (2006.01)
(Continued)

(52) U.S. Cl.
CPC .............. F16D 65/04 (2013.01); B29C 70/78 (2013.01); C22F 1/04 (2013.01); F16D 65/092 (2013.01);
(Continued)

(58) Field of Classification Search
CPC ..... F16D 2069/0491; F16D 2069/0475; F16D 2200/003; B29C 70/78; B29K 2705/02;
(Continued)

(56) References Cited

U.S. PATENT DOCUMENTS 2,827,135 A 3/1958 Sorchy
3,765,877 A * 10/1973 Sperry .................... C22C 21/02
420/535
(Continued)

FOREIGN PATENT DOCUMENTS

EP 1469221 A1 10/2004
JP 9-126258 5/1997
(Continued)

OTHER PUBLICATIONS

International Search Report/Written Opinion for IT TO20130855, 7 pages.
(Continued)

Primary Examiner — Bradley T King
Assistant Examiner — Mahbubur Rashid
(74) Attorney, Agent, or Firm — Barclay Damon LLP

(57) ABSTRACT

A method for the production of braking elements for vehicles, in particular brake pads, includes a die forming step by means of fine and/or traditional shearing of a metal support and a molding step upon the metal support of a block of friction material. The friction material is selected from the group of asbestos free materials, while the metal plate is made of an aluminum alloy selected from the group consisting of aluminum alloys subjected to precipitation hardening (age-hardening alloys) and is made from the fine and/or traditional shearing of a metal sheet when the alloy is in a solubilized state. The alloy is not age hardened until a friction material baking step in order to gain the mechanical properties needed for its operation.

11 Claims, 2 Drawing Sheets

(51) Int. Cl.
| | |
|---|---|
| F16D 69/04 | (2006.01) |
| F16D 69/02 | (2006.01) |
| B29C 70/78 | (2006.01) |
| C22F 1/04 | (2006.01) |
| F16D 69/00 | (2006.01) |
| B29K 705/02 | (2006.01) |
| B29L 9/00 | (2006.01) |
| B29L 31/16 | (2006.01) |

(52) U.S. Cl.
CPC ........... *F16D 69/00* (2013.01); *F16D 69/026* (2013.01); *F16D 69/04* (2013.01); *B29K 2705/02* (2013.01); *B29L 2009/00* (2013.01); *B29L 2031/16* (2013.01); *F16D 2069/0491* (2013.01); *F16D 2200/003* (2013.01)

(58) Field of Classification Search
CPC ... C22F 1/04; Y10T 29/4998; Y10T 29/49988
USPC .................................................... 188/250 B
See application file for complete search history.

(56) References Cited

U.S. PATENT DOCUMENTS

| | | | | |
|---|---|---|---|---|
| 4,055,417 | A | 10/1977 | Komiyama | C22C 21/04 420/532 |
| 5,123,973 | A | 6/1992 | Scott | C22F 1/043 148/417 |
| 5,198,045 | A | 3/1993 | Cho | C22C 21/12 148/417 |
| 5,342,459 | A * | 8/1994 | Klemp | C22C 21/02 148/417 |
| 6,303,236 | B1 * | 10/2001 | Nakao | B21C 23/22 188/250 R |
| 6,416,710 | B1 * | 7/2002 | Oshiro | C22C 21/02 420/534 |
| 6,474,453 | B2 * | 11/2002 | Sano | F16D 65/092 188/218 XL |
| 6,908,516 | B2 * | 6/2005 | Hehmann | C23C 14/14 148/406 |
| 6,942,006 | B2 * | 9/2005 | Kono | B22D 17/007 164/113 |
| 7,017,645 | B2 * | 3/2006 | Johnson | B22D 11/001 164/113 |
| 7,784,593 | B2 * | 8/2010 | Hara | B62L 1/005 188/250 B |
| 8,246,763 | B2 | 8/2012 | Yamada | C22F 1/043 148/417 |
| 9,453,272 | B2 * | 9/2016 | Vo | C22F 1/04 |
| 2001/0024735 | A1 * | 9/2001 | Kuhlmann-Wilsdorf | H01R 39/22 428/611 |
| 2002/0033315 | A1 | 3/2002 | Yamane | |
| 2002/0153210 | A1 * | 10/2002 | Kurita | C25D 3/565 188/200 |
| 2003/0155049 | A1 * | 8/2003 | Bergsma | B22D 17/007 148/549 |
| 2005/0100472 | A1 * | 5/2005 | Yamada | C22C 21/04 420/534 |
| 2005/0252581 | A1 * | 11/2005 | Higashi | C22C 21/02 148/417 |
| 2005/0269167 | A1 * | 12/2005 | Iwai | B62L 1/005 188/26 |
| 2006/0016644 | A1 * | 1/2006 | Takizawa | B62L 1/005 188/24.11 |
| 2006/0278308 | A1 * | 12/2006 | Shankar | B22F 1/0044 148/513 |
| 2007/0138235 | A1 * | 6/2007 | Kumagai | B23K 20/1225 228/112.1 |
| 2007/0194603 | A1 | 8/2007 | Bouet-Griffon et al. | |
| 2008/0156600 | A1 * | 7/2008 | Eastham | F16D 65/0006 188/250 B |
| 2009/0084642 | A1 * | 4/2009 | Iwai | F16D 65/092 188/251 A |
| 2009/0148721 | A1 * | 6/2009 | Hibino | B21D 22/20 428/650 |
| 2012/0241055 | A1 * | 9/2012 | Okamoto | B21J 5/00 148/552 |
| 2012/0298513 | A1 * | 11/2012 | Shimao | C22F 1/05 205/50 |
| 2014/0193666 | A1 * | 7/2014 | Brinkman | B23K 20/2336 428/654 |
| 2014/0360633 | A1 * | 12/2014 | Sato | B22C 9/24 148/549 |
| 2015/0107945 | A1 * | 4/2015 | Bertoldo | B29C 70/78 188/250 B |

FOREIGN PATENT DOCUMENTS

| | | |
|---|---|---|
| JP | H09-242794 | 9/1997 |
| JP | 2006-527792 | 12/2006 |
| JP | 2008115413 A | 5/2008 |
| JP | 2013-053688 | 3/2013 |

OTHER PUBLICATIONS

Time-temperature-property curves for quench sensitivity of 6063 aluminum alloy; Hong-ying Li et al.; ScienceDirect; available online at www.sciencedirect.com; Transactions of Nonferrous Metals Society of China 23; 2013; pp. 38-45; 8 pages.

A Methodology to Predict the Effects of Quench Rates on Mechanical Properties of Cast Aluminum Alloys; Shuhui Ma; a dissertation submitted to the faculty of Worcester Polytechnic Institute in partial fulfillment of the requirements for the Degree of Doctor of Philosophy in Materials Science and Engineering; May 2006; 125 pages.

Japanese Office Action for JP 2014-214594, dated May 8, 2018; 7 pages.

* cited by examiner

METHOD FOR THE PRODUCTION OF BRAKE PADS AND ASSOCIATED BRAKE PAD

CROSS REFERENCE TO RELATED APPLICATIONS

This application is a continuation application of U.S. application Ser. No. 14/519,761, filed Oct. 21, 2014, which claims priority upon Italian Patent Application No. TO2013A000855, filed Oct. 21, 2013, under relevant sections of 35 U.S.C. §§ 119 and 120. The entire contents of each noted document is hereby incorporated by reference.

TECHNICAL FIELD

The present invention relates to a method for the production of braking elements, in particular of brake pads, and which have a strength that is comparable to that of known brake pads of the same type, but that are significantly reduced in weight and that exhibit high corrosion resistance.

BACKGROUND OF THE INVENTION

It is known that a brake pad is a vehicle wheel braking element intended for interacting with either the disc or drum brake of the wheel, and comprises a metal support, known as "backplate", a block of friction material, which is molded in its entirety onto one side of the metal support, and an isolating/damping layer arranged between the block of friction material and the metal support which is referred to by the term "underlayer".

The metal support is commonly made of steel or cast iron, since in use it must withstand both considerable thermal and mechanical stresses. However, steel supports and, in general, those of a iron material, have the dual disadvantage of being subject to corrosion, therefore they require adequate protection treatments, and have a relatively high weight. The growing demand in the "Automotive" field for weight reduction and increased performance, for example corrosion resistance, has prompted research into the use of alternative materials such as plastics/composites rather than light alloys such as aluminum alloys, as it is known from JP9126258.

Unfortunately, mechanical and/or thermo-mechanical strength problems associated with these materials have so far prevented their use, since they are not suitable for high-temperature and high-stress applications.

It is, for example, known that common aluminium alloys lose important mechanical properties such as tensile strength and yield strength when subjected to thermal cycling, at temperatures normally achieved during the brake pad manufacturing processes, rather than when they are used on a vehicle.

SUMMARY OF THE INVENTION

The purpose of the present invention is to provide a method for producing brake pads in a simple and economical way and, more generally, for producing braking elements, therefore also brake shoes, which method allows to produce light and substantially free from corrosion braking elements but having performance characteristics that are comparable to those of known braking elements equipped with metal supports made of steel or cast iron.

The invention therefore relates to a method for the production of braking elements for vehicles, in particular of brake pads, as defined in the attached claims. The invention also relates to a braking element for vehicles, in particular a brake pad, made according to the method of the invention.

According to the main aspect of the invention, the braking elements, in particular brake pads, are obtained in the usual way, through a fine shearing and/or traditional shearing pressing step of the metal support at room temperature starting with a sheet of metal, and a mold forming step upon the metal support of a block of friction material, which comprises a forming step of the block of friction material using a friction material compound that includes a baking step of the block of friction material, but by appropriately selecting, in combination between them, the metal material used to make the metal support and the time and process temperature parameters so as to simultaneously obtain optimal baking both of the friction material and of the metal material from which the support is made. In particular, the friction material is chosen from a group of asbestos free friction materials wherein the compound is a resin or a mixture of resins that have a friction material binding function, while the metal support is made of an aluminum alloy selected from a group consisting of aluminum alloys that are subjected to precipitation hardening also known as age-hardening aluminum alloys.

In addition, according to a preferred aspect of the invention, the metal support is obtained from the fine and/or traditional shearing of a "cold" metal sheet when the alloy is in a completely solubilized or only partially aged state; this physical state is known in the technical field of aluminum alloys as the "T4 State", wherein the alloy is malleable, and does not exhibit a high degree of hardness but rather a higher elongation percentage value, being therefore easy to work at room temperature. The chosen alloy is then completely aged only during the same frictional material baking step, a step that must always take place in order to form the block of friction material. During this friction material baking step the aluminum alloy from which the metal support is made undergoes a thermal cycle similar to that of age-hardening that, surprisingly, produces effects very similar to a standard age-hardening treatment for the same alloy, itself known in the art, such that the aluminum alloy arrives at a so-called "T6" physical state wherein the alloy is completely aged and stabilized (i.e. it is no longer subject over time to further precipitation of alloying elements within the metal matrix).

It was also discovered that an appropriate choice of baking parameters such as time, temperature and furnace type allows a block of friction material to be produced in a single step that meets the specific requirements and, simultaneously, a metal support that exhibits age-hardening such that it has mechanical properties that are comparable to those of current supports made of steel (S235JR, S275JR and S420MC are among the most common grades of steel) or cast iron.

The preferred aluminum alloys for carrying out the invention are the 2xxx, 6xxx and 7xxx series alloys and in particular the anticorrosive of 6xxx series, and more particularly the 6082 (preferred), 6181 or 6061 series anticorrosive aluminum alloys.

BRIEF DESCRIPTION OF THE DRAWINGS

Further characteristics and advantages of the present invention will become clear from the following description of an exemplary non-limiting embodiment thereof given purely by way of example and with reference to the appended drawings, wherein.

DETAILED DESCRIPTION OF THE INVENTION

Figure 1:
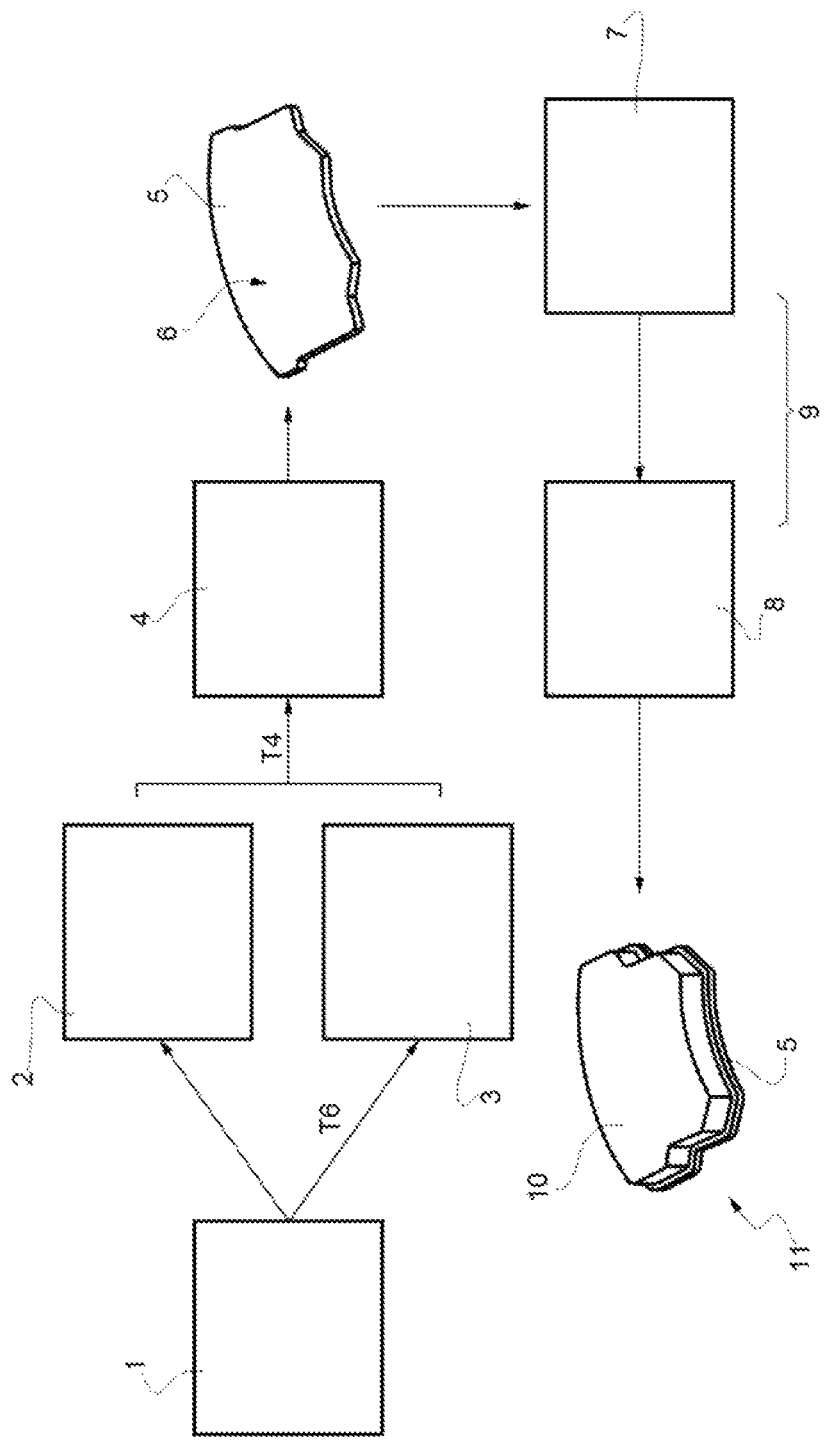
FIG. 1 depicts a block diagram of the method's process flow according to the invention.

With reference to FIG. 1, the block indicated by the reference number 1 is the initial step for the method according to the invention, during which a particular aluminum alloy is selected that, according to the invention, is an age-hardening wrought aluminum alloy preferably chosen from among those available on the market (the possibility should not be excluded that an aluminum alloy that is not currently on the market could be chosen but that is anyway an age-hardening alloy).

"Wrought or plastic working" aluminum alloys are defined as those that are used in a semi-finished state, above all laminates and extruded products.

The main designation system for these alloys is numeric and is based upon their chemical composition. This system references each alloy by a group of four numeric index the first of which identifies the series/family of alloys according to the following table:

TABLE 1

| | |
|---|---|
| 1xxx aluminum alloys(*) | pure aluminum, minimum 99.0%; |
| 2xxx | copper alloys; |
| 3xxx | manganese alloys; |
| 4xxx | silicon alloys; |
| 5xxx | magnesium alloys; |
| 6xxx | magnesium-silicon alloys; |
| 7xxx | zinc-magnesium (copper) alloys; |
| 8xxx | alloys containing different elements from those listed previously. |

(*)grouped according to the main alloying elements

The second index defines any variations from the original alloy for which the index 0 is reserved. For the 1xxx series, the last two digits indicate the purity of the aluminum, while for all of the others they identify the individual alloys within the series that they belong to.

The first designation of this kind dates back to 1954 and was introduced in the USA by the Aluminum Association. In this system, the four numeric indexes for each alloy are therefore preceded by the letters AA (i.e. AA 7075). The same numerical designation was recently introduced by European legislation. In this case the four numeric indexes are preceded by the letters EN AW (e.g. EN AW 7075), where EN indicates 'European Normalization' and AW refers to 'Aluminum Wrought' (wrought aluminum alloys).

For a better presentation and understanding of wrought alloys, a further classification criterion has been introduced which involves dividing them into: heat treatment alloys and work hardening alloys, depending on the structural-physical mechanism that determines their final level of mechanical resistance and, more generally, the combination of the various properties.

Heat-treated (tempered or age-hardening as they are otherwise referred to) alloys belong to the 2xxx, 6xxx, 7xxx and partially 8xxx series and are used for the production of all major types of semi-finished products extruded, laminated, forged and drawn products). Their typical characteristic is the fact that they can exhibit an increased mechanical resistance in response to specific heat treatments which then cause, from a microstructural point of view, the formation of hardening phases homogeneously dispersed within the aluminum matrix.

Classically, the treatments intended to carry out this process can be summarized as follows:
- high temperature heat treatment in order to achieve maximum solubilization of the alloying elements;
- rapid cooling (or quenching) to block this dissolved condition;
- low temperature (natural age-hardening) or medium-high temperature (artificial age-hardening) heat treatment during which the real formation of the hardening phases takes place (in general intermetallic compounds).

In some cases, in order to increase the mechanical resistance, heat treatments are alternated with specific plastic deformation treatments, thus resulting in the so-called thermo-mechanical cycles.

The following are the heat-treated alloys physical states together with the relative codes used for their designation:

TABLE 2

| | |
|---|---|
| T1 | Quenched from plastic transformation temperature and naturally aged; |
| T2 | Quenched from plastic transformation temperature; cold worked and naturally aged; |
| T3 | solution heat treated, quenched, cold worked and naturally aged; |
| T4 | solution heat treated, quenched, and naturally aged until reaching a stable condition; |
| T5 | quenched from an elevated temperature of plastic transformation and artificially aged until maximum mechanical resistance is achieved; |
| T6 | solution heat treated, quenched and artificially aged until maximum mechanical resistance is achieved; |
| T7 | solution heat treated, quenched and artificially overaged; |
| T8 | solution heat treated, quenched, cold worked and artificially aged; |
| T9 | solution heat treated, quenched, cold worked, artificially aged and cold temperature shaping process; |

According to the invention the selected aluminum alloy, which according to one aspect of the invention is an aluminum alloy belonging to one of the 2xxx, 6xxx and 7xxx series is on the market in the form of sheets (laminated). The aluminum alloy sheets in these series are generally available, even ready for delivery, only in the T6 state, while the T4 state is only available upon specific request to a foundry.

The block indicated by the number 2 includes the possibility of directly producing T4 state aluminum alloy sheets (or equivalent from a thermo-mechanical point of view), having produced them for example after hot-rolling with rapid air or water final cooling, thus producing a thermal cycle similar to that of a quench solution treatment that, for the above alloy series, includes homogeneous heating at temperatures above 500° C. and subsequent water cooling. In the T4 state, the aluminum alloy is completely solubilized (all alloying elements are in solid solution within the aluminum matrix), or else part of the alloying elements are already precipitated within the aluminum metal matrix, generally at the edge of the crystalline grains, and the alloy is partially naturally aged, but is however, in a thermodynamically stable state at room temperature for industrial applications where there is no longer further age-hardening (usually guaranteed for at least 6 months) unless it is artificially induced.

The block indicated by the number 3, which is preferably to be used for small series and prototypes, instead indicates to start with commercial T6 state alloys and bringing the sheets made of those T4 state alloys (or equivalent from a thermo-mechanical point of view) by means of a heat treatment (quench solution treatment) step on the sheet, wherein the alloy is heated to between 540° C. and 560° C. for 1-2 hours (annealing) to then be rapidly cooled by immersion in a bath of room temperature water (water quenching or hardening).

In both cases, at the end of blocks 2 and 3, a T4 physical state or equivalent sheet is obtained that is made of series 2xxx, 6xxx or 7xxx aluminum alloy.

Subsequently, within the block indicated by the number 4, the aluminum alloy sheet is subjected to a first step of the production method according to the invention consisting of a plastic deformation die forming step by means of fine and/or traditional shearing in order to produce a plurality of metal supports 5 one of which is shown schematically in FIG. 1. The metal support element 5, known in the field of braking elements as the "backplate", is shaped in the form of a common contour shaped flat plate (apart from in the case of drum brakes which are curved) and has a common flat side 6 intended to be directed in use towards an element to be braked (such as a disc or drum brake of a vehicle wheel) and is produced using the same methodology as for traditional steel supports but in this case, clearly, adapting this technology for the processing of aluminum alloys instead of steel.

Once the metal support 5 by means of fine and/or traditional shearing is obtained, this is sent to the block number 7 and, subsequently, to block number 8, which together represent a second step of the production method according to the invention, consisting of a mold forming step, on side 6 of the metal support 5, of a block 10 of friction material, this upon deposition on the side 6 of a damping and thermally insulating layer, known in the art and not illustrated for simplicity, known as "underlayer", so as to obtain at the end of the production cycle illustrated in FIG. 1, i.e. at the end of block number 8, a substantially complete and finished braking element 11 for vehicle braking systems, in the non-limiting case illustrated a brake pad.

Upon the molding and pressing of the friction material in block 7, the brake pad 11 within block 8 passes through a baking process, a process which is normally necessary for the consolidation of the friction material compound. The baking process can take place in furnaces of different types and with different heat transmission methods (radiation, conduction or convection), which can be commonly used as alternatives or in series in order to achieve the best brake pad 11 performance. At the end of block number 8 a braking element 11 is thus obtained, in the non-limiting case illustrated a brake pad, comprising a metal support 5 and a block 10 of friction material that has been rendered integral to the metal support 5 by the molding and baking of the block of friction material 10 onto the side 6 of the metal support 5 (after any possible deposition in a known way of the insulating/damping layer or "underlayer", known in the art and not illustrated for simplicity, mentioned above).

According to a first aspect of the invention, however, the metal support 5 is not made of steel, but of a specifically selected aluminum alloy able to be subjected to precipitation hardening (age-hardening alloy) belonging to one of the series 2xxx, 6xxx or 7xxx, and preferably an anticorodal 6xxx series alloy (the trade name of a commercial aluminum alloy used due to its good corrosion resistance), and specifically consisting of an alloy selected from the group of anticorrosive aluminum alloys 6082, 6061 and 6181.

A second aspect of the invention is constituted by the fact that, in combination with the selection of a specific aluminum alloy for the production of the metal support 5, with the selection of a specific method for obtaining the support 5, by means of fine and/or traditional shearing, and with the selection of a specific physical state of the aluminum alloy for obtaining the metal support 5, the material with which the block of friction material 10 is made can be any of the non-asbestos friction materials commonly known in the art.

For example, a friction material that can be used in the invention is formed from a composition or mixture comprising a fibrous base, a filler and an organic binder and may include, together with the inorganic and/or organic fibers, metal fibers within the fibrous base. The friction material composition may also include from 0% to 10% by volume of solid lubricants, for example tin sulfides, such as SnS and $SnS_2$. It is also desirable to include graphite and/or coke within the composition. The graphite can be of any type of graphite known in the art. The graphite (and/or coke) is added in an appropriately selected amount, which is preferably between 2% and 15% by volume on the total friction material composition.

The fibrous base typically consists of any organic or inorganic fiber other than asbestos. Illustrative examples include inorganic fibers such as glass fiber, rock wool, wollastonite, sepiolite and attapulgite, and organic fibers such as carbon fibers, aramid fibers, polyimide fibers, polyamide fibers, phenolic fibers, cellulose and acrylic fibers or PAN (Poly-Acryl-Nitrile) fibers. The fibrous base can be used in the form of either short fibers or powder. Numerous materials known in the art can be used as organic or inorganic fillers. Illustrative examples include precipitated calcium carbonate, barium sulfate, magnesium oxide, calcium hydroxide, calcium fluoride, slaked lime, talc, molybdenum trioxide, zirconium silicate, iron oxide, mica, iron sulfide, silicon dioxide, vermiculite, powdered rubber (rubber powder and granules), nitrile rubber powder (cured product), powdered metals (except copper and its alloys), acrylic rubber powder (cured product).

These compounds may be used alone or in two or more combinations thereof. The amount of these fillers is preferably between 2% to 40% by volume based on the total composition of the friction material.

The binder may be any organic binder known in the art. Illustrative examples of suitable binders include phenolic resins, melamine resins, epoxy resins; various modified phenolic resins such as epoxy-modified phenolic resins, oil-modified phenolic resins, alkylbenzene-modified phenolic resins and acrylonitrile-butadiene rubber (NBR). Any one or combinations of two or more of these compounds may be used. The binder is included in an amount preferably ranging from 2% to 30% by volume based on the total composition of the friction material.

However, the applicant's technician's have surprisingly found that appropriate modifications to the time-temperature profile to which the specific friction materials described above must normally be subjected in order to "bake" the "green" (non-hardened) compound are capable of producing within the previously mentioned selected aluminum alloys, if starting out from a suitable physical state, an artificial age-hardening phenomenon which produces a considerable improvement in mechanical characteristics, such as to enable the metal supports 5 to reach mechanical characteristics of hardness and resistance comparable to those of the steel that is normally used for the metal supports of the brake pad, also thanks to the fact that the selected aluminum alloys have a yield strength that is extremely close to that of the tensile strength, unlike the commonly used steels wherein the yield strength (though never low enough to cause irreparable damage to the brake pad) is much lower than that of the tensile strength.

Even more surprisingly it has been found experimentally, that the mechanical characteristics of the metal support 5 obtained from the selected aluminum alloy do not significantly decay even as a result of the heating caused by repeated braking, because they can dissipate the heat generated by friction so well (as a numerical example the thermal conductivity of the 6082 alloy is 172 W/m° C. compared to about 50 W/m° C. of a low alloy steel alloy) that the operating temperatures never reach critical levels, this is something totally unexpected and was not predictable beforehand. In practice, the friction elements 11 obtained according to the invention have proved to be capable of passing the mechanical braking bench tests known as "Badewanne" and "Auto motor sport", even though the metal support 5 is not made of steel, this is entirely new and surprising, as it is well known that due to partial re-solubilization of the precipitated alloying elements, aged aluminum alloys lose their mechanical characteristics when heated.

This allows for significant advantages to be obtained compared to known braking elements with steel backplates.

The expected advantages consist in a reduction in the weight of the complete braking element of the invention to around half the weight of a traditional brake pad with a steel backplate (the weight of the backplate alone is reduced to ⅓); and excellent corrosion resistance (in particular if the backplate is made from 6xxx series alloys).

Further advantages of the invention are a high level of cold workability thus allowing for accurate fine and/or traditional shearing operations to be performed with a high degree of accuracy and excellent finishing without substantial waste and with lower and reduced mold wear. Additionally, aluminum, which features high thermal conductivity, can improve braking performance (less heating of the friction material due to high thermal dispersion through the backplate).

Based on an examination of FIG. 1 and on the basis of what has been described above, it follows that the method of the invention for obtaining vehicle braking elements, in particular brake pads, comprises the aforementioned steps and namely:

die forming a metal support by means of fine and/or traditional shearing; and mold forming a block of friction material on a first side of the metal support facing in use an element to be braked so as to make the block of friction material integral to the metal support.

It differs from the prior art in that, in combination with the fact that the friction material is selected from the group of asbestos free friction materials, the metal support is made of a specifically selected material consisting of an aluminum alloy selected from the group of aluminum alloys subjected to precipitation hardening (age-hardening alloys).

A further aspect of the invention consists in the fact that the fine and/or traditional shearing step of the metal support is preferably performed on an aluminum alloy able to be subjected to precipitation hardening which is still in a completely or partially solubilized state; age-hardening of the aluminum alloy with resulting precipitation of at least part of the alloying elements and recrystallization of the aluminum matrix, being performed during, and by means of the mold forming step of the block of friction material.

As already mentioned, the aluminum alloy subjected to precipitation hardening is selected from the group of 2xxx, 6xxx and 7xxx alloy series and in particular from the group of anticorrosive (type 6xxx alloys) with a preference for 6082, 6061 and 6181 alloys.

The fine shearing step of the metal support is preferably carried out on a sheet of 6082, 6061 or 6181 series aluminum alloy which is at the T4 physical state; this T4 physical alloy state is then brought back to the T6 physical state during the mold forming step of the block of friction material.

The mold forming step of the block of friction material on the aluminum alloy metal support includes a forming step of the block 10 on the metal support 5 using a friction material compound (block 7) and a baking step of the entire friction element thus produced (block 8) in order to crosslink the resin (or mixtures of resins) that makes up the compound.

Specifically, the aluminum alloy with which the metal support 5 has been made is an age-hardening alloy able to be subjected to precipitation hardening, which during the fine and/or traditional shearing step is at a completely or partially solubilized state. The alloy undergoes artificial age-hardening during the baking step of the block of friction material, where the baking step involves baking in a static furnace between 180 and 250° C. for 30-120 minutes together with an IR radiation step intended to bring the friction material to a temperature of between 240 and 260° C. for a duration of 5 minutes (the overall temperature ramp can last approximately 30 minutes), followed by an air cooling step at room temperature.

In this way the previously described friction element 11 is obtained, which element is characterized by the fact that the aluminum alloy that the metal support 5 is made from is an anticorrosive alloy, preferably of the 6082, 6061 or 6181 series, and which alloy is in a completely aged and stabilized state having mechanical properties that are comparable to the maximum that can be obtained by the alloy when in a completely aged state.

The invention is now further described with reference to some examples of practical implementation.

EXAMPLE 1

Test specimens are prepared from commercial 6082 anticorrosive sheet aluminum alloy, available on the market in the T6 physical state of the alloy from a number of suppliers (including for example: AMAG, Thyssen Krupp, Alcoa, Novelis, Comalco, Aviometal, AiroldiMetalli). Half of the specimens are subjected to solubilization treatment and quenching consisting of heating them to 560° C. for 1.5 hours with a subsequent final quenching in water at room temperature. Subsequent metallographic inspection confirms that the treated specimens have been brought back to the T4 physical state of the alloy.

Fine shearing tests are performed on part of the T6 state specimens, hereinafter referred to only as T6 and part of the T4 state specimens, hereinafter referred to only as T4: the T4 specimens are easily die formed and the edges feature excellent surface finishing; because of the greater hardness and lower tensile elongation percentage the T6 specimens are more difficult to die-form, thus obtaining unsatisfactory surface finishing of the cutting edge, however it is possible to proceed with the shearing.

The specimens were also subjected to a standard bending test, revealing that the T4 specimens feature much better performance (minimum curvature radius reached without producing any tears).

Figure 4:
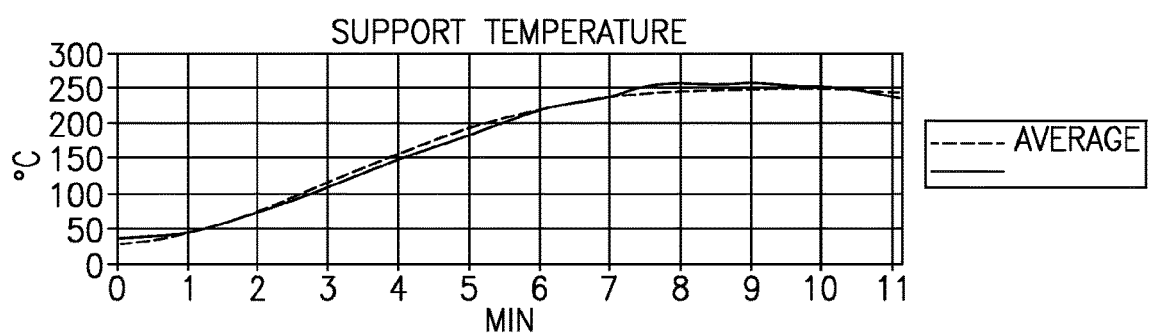
FIG. 4 illustrates the metal support temperature trend line diagram during the baking step of a braking element carried out according to the invention, with the friction material block having been obtained from standard compounds of a type known in the art.

Using the remaining specimens, metal sheet fragments of 270×50×5.5 mm (5.5 mm is the thickness of the sheet) are prepared which are subjected to a thermal cycle that is identical to that of the mold forming of a known brake pad with a steel metal support: baking in a static furnace at 225° C. for 30 minutes in an IR furnace (infrared radiation) at 245° C. for 5 minutes (total ramp duration of 15 minutes), with final air cooling and with the graph of FIG. 4 being obtained by means of temperature probes. The standard artificial age-hardening cycle for 6082 alloy consists instead in heating to 200° C. for 1 hour.

At the end of the baking step, the specimens are tested and reveal tensile strength and yield strength values which are comparable with those of the original T6 state alloy together with a crystalline structure having finer germination.

Brake pads are obtained from the previously sheared T4 and T6 specimens, subsequently die forming upon them, a block of the frictional material selected, by way of experiment and not binding for future applications, among those commonly used and having the following characteristics:

| MATERIAL COMPOSITION | Formula 1 |
|---|---|
| Aramid fibers | 5.4 |
| Friction powder | 11.7 |
| Powdered rubber | 2.5 |
| Graphite | 5.7 |
| Phenolic resin | 18.1 |
| Ca/Mg silicate | 14 |
| Ba sulfide | 24.8 |
| Bi/Fe/Sn sulfide | 2.7 |
| Zirconium oxide | 8.2 |
| Copper powder | 6.9 |
| TOTAL | 100.00 |

Figure 2:
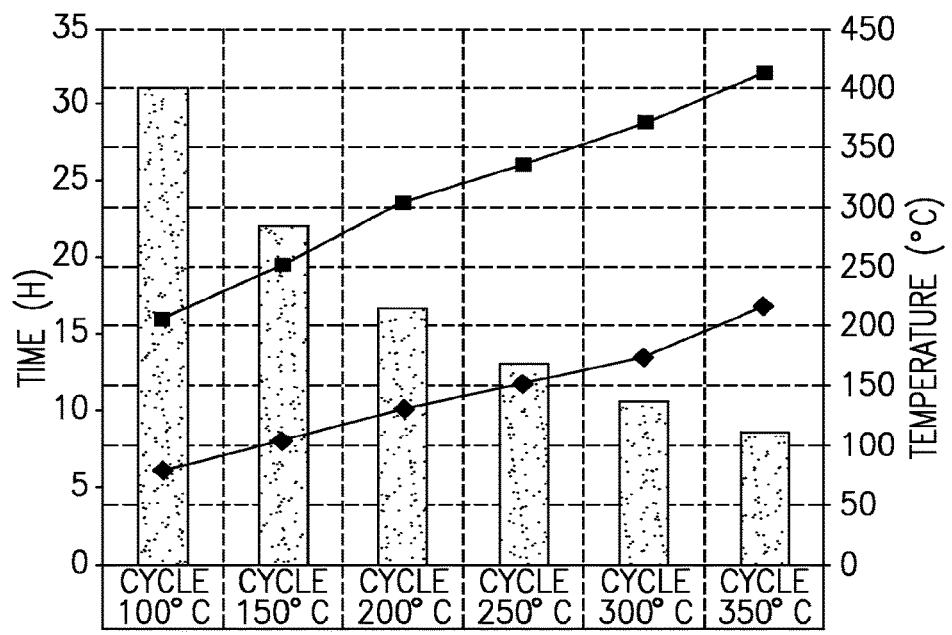
FIG. 2 illustrates an experimental time/temperature graph of the brake pads produced according to the invention. The graph was obtained by means of a bench test according to the ATE 3-91305-01 standard which is also referred to as the "Badewanne" test, wherein the temperature ranges have been modified to: 100-150-200-250-300-350° C. instead of 30-60-100-200-300-400° C., thus eliminating the cold curve and adding hot cycles in order to intensify the thermo-mechanical stresses applied to the aluminum alloy metal supports.
Figure 3:
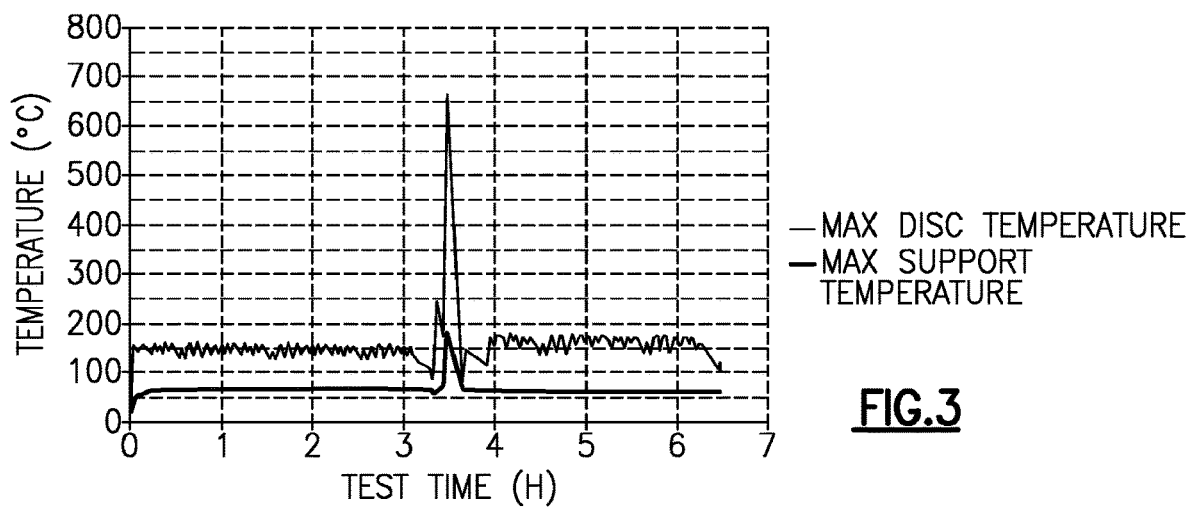
FIG. 3 illustrates an experimental time and temperature graph, obtained from an additional bench test, commonly known as the "Auto motor sport" test carried out according to the TRW TS4-16-102 standard using brake pads produced according to the invention.

The brake pads thus obtained were subjected to the "Badewanne" ATE 3-91305-01 (temperature 100-350° C.) and "Auto motor sport" TRW TS4-16-102 bench tests and the temperatures of the support and brake disc were measured using temperature sensors. The average of the results obtained is shown in FIGS. 2 and 3. As can be appreciated from the graph in FIG. 2 (Badewanne test), which reports brake tests carried out with different starting and increasing brake disc temperatures (from 100° C. to 350° C. peeking at 412° C.), the brake disc temperature (upper curve, square intersection points) rises progressively, as does the support temperature curve (bottom curve, rhombic intersection points) but less and remaining at much lower values. The graph of FIG. 3 (Auto motor sport test) provides trend over time of the aluminum alloy metal plate temperature which never exceeds 200° C. even in the most extreme conditions where the disc has reached 661° C. The physical examination of the brake pads after testing revealed that:

1. At the end of the test the support dimensions remain unchanged from after the fine shearing: QeTF: 77.59/-77.60>QeFine Test: 77.59/77.59;
2. The flatness remains unchanged (verified using a reference line and micrometric comparator <0.1 mm);
3. There are no notable signs of wear, deformation or dents within the sliding areas;
4. The HRB hardness (measurement scale not typically used for aluminum but used on the bench) remains the same before and after the tests.

CONCLUSIONS

During normal and also extreme operation of the pads, the tested alloy did not suffer any structural changes nor decreased their performance.

Even with those specimens where the highest possible hardness was not achieved (about −20% compared with supplied values of the metal sheet) during the friction material molding/baking step, the selected alloy provided mechanical characteristics that were nonetheless sufficient to pass the Badewanne ATE 3-91305-01 (modified temperatures between 100-350° C.) and "Auto motor sport" TRW TS4-16-102 tests without measurable permanent deformation, thus meaning that the production method starting with the T4 state alloy is certainly effective and results in completely reliable brake pads.

Therefore, the objectives of the invention are fully achieved.

The invention claimed is:

1. A braking element, comprising:
   a metal support; and
   a block of friction material which has been made integral to the metal support by mold forming the block of friction material on a side of the metal support; and in which:
   i)—the friction material comprises a non-asbestos organic (NAO) material; and
   ii)—the metal support is made from an anticorrosive alloy made from one of the 2xxx, 6xxx or 7xxx series of aluminum alloys that has been age or precipitation hardened from a T4 state to a T6 state during the mold forming of the block of friction material on the side of the metal support, wherein the aged or precipitation hardened aluminum alloy does not solubilize under heat experienced during braking, thereby enabling the metal support to maintain enhanced hardness and resistance characteristics and in which the braking element is part of a motor vehicle braking system.

2. The braking element according to claim 1, wherein the braking element is a brake pad.

3. The braking element according to claim 1, wherein the anticorrosive alloy is from one of the 6082, 6061 or 6181 series.

4. A braking element comprising:
   a metal support, and
   a block of friction material integrally disposed on a first side of the metal support, wherein:
   i) the metal support being die formed by means of shearing, the metal support being formed of an aluminum alloy selected from a group consisting of aluminum alloys suitable for precipitation or age-hardening, the aluminum alloy being in a completely or partially solubilized state during the die forming;
   ii) the block of friction material being mold formed on the first side of the metal support facing, in use, an element to be braked, including heat treating the block of friction material to form it integral to the metal support, the friction material being selected from a group of asbestos free friction materials; and iii) wherein the selected aluminum alloy has undergone precipitation or age-hardening during the heat treating of the block of friction material from a T4 state to a T6 state such that the resulting metal support possesses and maintains enhanced hardness and resistance characteristics in which the aluminum alloy of the resulting precipitation or age-hardened metal support does not solubilize due to heating during braking to enable hardness and resistance-characteristics of the metal support to be maintained and in which the braking element is part of a motor vehicle braking system.

5. The braking element according to claim 4, wherein the aluminum alloy is selected from the group of series 2xxx, 6xxx and 7xxx alloys.

6. The braking element according to claim 4, wherein the aluminum alloy is selected from a group of anticorrosive (series 6xxx) alloys.

7. The braking element according to claim 6, wherein the aluminum alloy is selected from the group of 6082, 6061 and 6181 alloys.

8. The braking element according to claim 4, wherein the aluminum alloy is a series 6082, 6061 or 6181 aluminum alloy sheet in a physical state T4, the aluminum alloy transitioning to a physical state T6 when age or precipitation hardened during the mold forming step.

9. The braking element according to claim 4, wherein the mold forming step of the block of friction material on the aluminum alloy metal support includes forming the block of friction material with a compound of friction material and baking the entire block thus obtained for crosslinking a resin present in the compound.

10. The braking element according to claim 9, wherein the aluminum alloy undergoes an artificial age-hardening during baking of the block of friction material, said baking occurring in a static furnace between 180 and 250° C. up to 120 minutes and an IR irradiation step adapted to bring the friction material to a temperature between 240 and 260° C. for a duration of up to 30 minutes, followed by a step of air cooling at room temperature.

11. The braking element according to claim 4, wherein the braking element is a brake pad.

* * * * *